United States Patent Office 3,002,936
Patented Oct. 3, 1961

3,002,936
METHOD FOR MAKING REFRACTORY ARTICLES
Charles R. Allenbach, Tonawanda, and John C. Burbach, Niagara Falls, N.Y., assignors to Union Carbide Corporation, a corporation of New York
No Drawing. Filed Apr. 29, 1958, Ser. No. 731,628
6 Claims. (Cl. 252—518)

This invention relates to a novel composition of matter and to a method of making articles from same. More particularly, it relates to a method of making refractory articles.

Molybdenum disilicide, $MoSi_2$ is very useful in high temperature applications since it is inherently resistant to oxidation up to 1700° C. and has a melting point of approximately 1870° C.

Hot-pressed, cold-pressed and sintered, slip-cast and sintered, and extruded and sintered rods and bars of substantially pure molybdenum disilicide when used as heating elements have a very low electrical resistance. This low resistivity, therefore, requires a heavy electrical current to heat such elements to a desired temperature. Generation of heat in a resistor is determined by the equation: $W = I^2R$, where W equals watts as heat energy, I equals current in amperes, and R equals resistance. It can thus be readily seen that heater resistance has an important effect on the amperage necessary to develop a certain heat output in furnaces and like apparatus where said heaters are employed.

Shapes slip-cast and sintered from micron sized substantially pure molybdenum disilicide powder also evidence a marked lack of thermal shock resistance. Experience has proved that such sintered bodies spall and break after two to four cycles of water-quenching from a red heat. This presents a severe disadvantage in the use of slip-cast and sintered molybdenum disilicide articles where intermittent or continuous high-temperature applications are necessary, such as in crucibles, furnace parts, refractory ware for molten metals, heating elements, rocket nozzles and missile components. It has been observed that hot-pressed and cold-pressed and sintered shapes of substantially pure molybdenum disilicide retain satisfactory thermal shock resistance in the unloaded or unstressed condition, but that such pressed samples are limited to the shapes that can be obtained by such a fabrication process. Although slip-casting and sintering of intricate molybdenum disilicide shapes is a much simpler operation than pressing, it has the extreme disadvantage of producing articles of a much lower thermal shock resistance.

The use of various particle size distributions of molybdenum disilicide under varying pressing pressures and sintering temperatures does not reveal any significant improvement in desired electrical resistance values and variations in sintering temperatures do not increase thermal shock resistance of slip-cast sintered bars. Increasing particle size actually increases the resistance of an element slightly due to the greater number of voids; however, the reduction in physical strength accompanying such a change makes this method unfeasible.

It is accordingly an object of this invention to provide a modified molybdenum disilicide mixture having substantially high ohmic resistance, and high resistance to thermal shock in addition to the other high temperature characteristics of pure molybdenum disilicide.

It is to be understood that the term substantially, high ohmic resistance refers to an ohmic resistance value in excess of that of pure molybdenum disilicide which is shown from experiment and by the literature to be approximately 22 microhm-cm. Also the terms substantially pure molybdenum disilicide and unmodified molybdenum disilicide refer to the commercially pure product having only slight normally occurring impurities.

According to this invention, there is provided a novel process for making refractory articles which comprises mixing between about 5 and 25 weight percent of finely divided silicon nitride and between about 95 and 75 weight percent of finely divided molybdenum disilicide and forming said finely divided mixture into desired shapes with application of heat.

Since the electrical resistivity of substantially pure molybdenum disilicide is very low for heating element applications and the thermal shock resistance in slip-cast and sintered form is poor, it is necessary to make desired improvements in the physical and chemical characteristics of the pure material.

It has been found that the short-comings of substantially pure molybdenum disilicide as previously enumerated can best be limited by a modification of the molybdenum disilicide in which a secondary substance is added in the desired amount, ground together or separately to the desired particle size, mixed and then formed into useful articles of manufacture by powder metallurgical techniques such as hot-pressing, cold-pressing, or slip-casting and sintering.

Silicon nitride, $Si_3N_4$, has been found to be an excellent addition agent for molybdenum disilicide. By suitable admixtures of these two substances, the mechanical and electric properties of the composite material can be altered to desired values. Samples of 0, 5, 10, 15, and 30 percent additions by weight of silicon nitride to molybdenum disilicide were cold-pressed and sintered, or slip-cast and sintered, and the room temperature resistivity of these samples was measured and is presented in Table I.

TABLE I

| Sample No. | 1 | 3 | 4 | 5 | 6 |
|---|---|---|---|---|---|
| Weight percent Silicon Nitride | 0 | 5 | 10 | 15 | 30 |
| Resistivity, Micro-ohm-cm | 28 | 44 | 34 | 84 | 939 |

The increased thermal shock resistance of the silicon nitride modified molybdenum disilicide will be apparent from Table II. It will be noted that the first four samples contained no silicon nitride and either spalled or cracked after two to three cycles. A thermal shock cycle consisted of heating the elements to a red heat and then quenching them in cold water. The property of high thermal shock resistance is of especial importance when the article is to be subjected to frequent heating and cooling cycles as in jet engine applications and furnace and kiln furniture.

TABLE II

| Sample No. | Weight Percent of Silicon Nitride | Thermal Shock Cycles | Effect |
|---|---|---|---|
| 1 | 0 | 3 | Spalled. |
| 2 | 0 | 5 | Cracked. |
| 3 | 0 | 1 | Spalled. |
| 4 | 0 | 3 | Do. |
| 5 | 5 | 10+ | None. |
| 6 | 10 | 10+ | Do. |
| 7 | 15 | 10+ | Do. |
| 8 | 30 | 1 | Spalled. |

*Operating example*

A 5 percent silicon nitride 95 percent molybdenum disilicide heating element was operated satisfactorily in a test furnace. The bar was prepared by slip-casting of micron sized powder followed by sintering at 1700° C. for one-half hour. Dimensions of the bar were 15 inches overall length, ½ inch diameter at the ends, 9 inches length of the hot zone and ⅜ inch diameter of the hot zone. Room temperature resistivity of the specimen before testing was 53.4 microhm-cm., total bar resistance was 1.92 milliohms at room temperature.

The bar was operated for 5½ hours total and at 1600° C. or better for 4½ hours. On the heat up molybdenum trioxide (MoO₃) fumes were evolved from 1000 to 1200° C. as the protective silica film formed. Above 1200° C. the fuming ceased as a vitreous film formed from crystalline oxide. Power input was very high starting with a cold furnace due to large initial radiation losses. When 1600° C. was first reached, the calculated power input was 4100 watts. At the end of the test, after 4½ hours, the furnace walls themselves radiated at 1275° C. and power requirements decreased to 3180 watts to maintain a temperature of 1635° C. on the bar. A maximum temperature of 1640° C. was reached in the specimen.

There was a significant bubbling on the surface of the specimen and a heavy glazing formed on the hot zone. The bubbling is thought to be due to the slow dissociation of the silicon nitride into nitrogen gas and silicon which oxidizes to silica. This assumption is partially verified by a slight loss of resistance of the bar with time. It appears that the silicon nitride promotes a very rapid and heavy formation of the protective silica glaze, much more so than occurs in unmodified molybdenum disilicide.

It is also believed that the slow evolution of nitrogen gas forms a temporary inert shield within the bar, and that the liberated silicon from the silicon nitride preferentially oxidizes to the protective silica glaze rather than molybdenum silicide silicon. This behavior constitutes an additional improvement over unmodified molybdenum disilicide. Although this theory of the reaction is not completely understood, quantitative data of a sample used at elevated temperatures showed a marked decrease in the amount of silicon nitride present. It may thus be seen that the silicon nitride does not act as a simple dielectric or resistive filler as is common in resistor manufacture, but also acts as an agent to promote the formation of a protective glaze on the surface of the bar and further emits nitrogen to form an inert shield to prevent air oxidation within the bar before the glaze forms on the surface. It also acts to improve the thermal shock resistance of articles, especially slip-cast and sintered shapes. A synergistic effect not heretofore attainable with other fillers has been gained by the use of the silicon nitride-molybdenum disilicide mixture.

It may thus be seen that the addition of 5 percent silicon nitride to molybdenum disilicide approximately doubles the electrical resistance of cold-pressed, hot-pressed, or slip-cast shapes. Doubling the resistance of such heating resistors reduces amperage requirements to obtain the same heat output by 30 percent.

It can be readily seen that by careful control of the silicon nitride content, molybdenum disilicide resistors can be made with an improved resistivity value, whereas unmodified molybdenum disilicide articles have a relatively unalterable resistance.

Although heating elements containing molybdenum disilicide and silicon nitride in amounts up to 50 percent are at least slightly conducting, it has been found that the range of silicon nitride from 5 to 25 percent by weight is preferred. This is so because with extremely high resistance values, it is necessary to have extremely high voltage generating equipment supply power to the heating elements. For practical purposes it is convenient to have power supplies supplying resistance loads which do not require extremely heavy currents or unusually high voltages as the cost of the equipment becomes prohibitive in either case. Also, as the silicon nitride content exceeds about 25 percent by weight the physical strength of the articles is so low that they are very difficult to handle or work with.

It has been found from experiment that amounts of silicon nitride under 5 weight percent have only slight effect on the final characteristics of the article. The 5 weight percent level has thus been selected as the minimum practical level for silicon nitride in the pre-heating mixture.

It may also readily be seen from the examples that the addition of small amounts of micronized silicon nitride to micronized molybdenum disilicide in slip-cast objects increases the thermal shock resistance markedly. Unmodified slip-cast molybdenum disilicide bars and rods spalled or cracked after two or three cycles of water-quenchings from 900° C. Bars containing 5 percent silicon nitride and 95 percent molybdenum disilicide did not crack or spall under these conditions exceeding ten cycles. A practical field of use of mixed silicon nitride molybdenum disilicide wares is thus made available. These diversified uses include slip-cast ware for high temperatures in corrosive aqueous systems (except fluorides) in laboratory ceramic ware, thermocouple protectors, molten-metal-containing crucibles, heating element resistors, kiln furniture, rocket nozzles, rocket motors, missile-nose cones (thermal barrier penetration), etc., where a combination of high temperature oxidation resistance and thermal shock resistance is desired which is superior to unmodified molybdenum disilicide and many metals or alloys.

Although this novel composition of matter has a wide range of uses as indicated above, it is especially well adapted for use in the fabrication of heating element resistors where control of the ohmic resistance, oxidation resistance at high temperatures and high thermal shock resistance are necessary.

While the invention has been described in a detailed manner with respect to certain embodiments as illustrated in the tables and operating example, it is to be understood that no limitations other than those embodied in the claims are intended.

What is claimed is:

1. A process for producing a refractory article which comprises forming a mixture of between about 5 and 25 weight percent of finely divided silicon nitride and between about 95 and 75 weight percent of molybdenum disilicide, shaping said mixture into a desired shape and heating said shaped mixture to the dissociation temperature of silicon nitride under oxidizing conditions whereby the silicon nitride dissociates to silicon and nitrogen and the silicon is oxidized to silicon dioxide.

2. A process for producing a refractory article which comprises preparing a casting slip having a ratio of between about 5 and 25 weight percent of finely divided silicon nitride and between about 95 and 75 weight percent of finely divided molybdenum disilicide, slip casting a desired shape, and heating said casting to the dissociation temperature of silicon nitride under oxidizing conditions whereby the silicon nitride dissociates to silicon and nitrogen and the silicon is oxidized to silicon dioxide.

3. A process for producing a refractory article which comprises preparing a casting slip having a ratio of between about 5 and 50 weight percent of finely divided silicon nitride and between about 95 and 50 weight percent of finely divided molybdenum disilicide, slip casting a desired shape, and heating said casting to the dissociation temperature of silicon nitride under oxidizing conditions whereby the silicon nitride dissociates to silicon and nitrogen and the silicon is oxidized to silicon dioxide.

4. A process for producing a refractory article which comprises forming a mixture of between about 5 and 50 weight percent of finely divided silicon nitride and between about 95 and 50 weight percent of finely divided molybdenum disilicide, shaping said mixture into a desired shape and heating said shaped article to the dissociation temperature of silicon nitride under oxidizing conditions whereby the silicon nitride dissociates to silicon and nitrogen and the silicon is oxidized to silicon dioxide.

5. A refractory article having a composition resulting from the sintering of a mixture consisting essentially of between about 5 and 50 percent by weight of finely divided silicon nitride and between about 95 and 50 percent by weight of finely divided molybdenum disilicide, said sintering having been conducted at the dissociation temperature of silicon nitride and under oxidizing conditions whereby the silicon nitride dissociates to silicon and nitrogen and the silicon is oxidized to silicon dioxide.

6. An electrical resistance type heating element having a composition resulting from the sintering of a mixture consisting essentially of between about 5 and 25 percent by weight of finely divided silicon nitride and between about 75 and 95 percent by weight of finely divided molybdenum disilicide, said sintering having been conducted at the dissociation temperature of silicon nitride and under oxidizing conditions whereby the silicon nitride dissociates to silicon and nitrogen and the silicon is oxidized to silicon dioxide.

References Cited in the file of this patent

UNITED STATES PATENTS

| | | |
|---|---|---|
| 2,406,275 | Wejnarth | Aug. 20, 1946 |
| 2,618,565 | Nicholson | Nov. 18, 1952 |
| 2,747,260 | Carlton et al. | May 29, 1956 |